US008339580B2

(12) United States Patent
Stuart et al.

(10) Patent No.: US 8,339,580 B2
(45) Date of Patent: Dec. 25, 2012

(54) SENSOR-GUIDED THREAT COUNTERMEASURE SYSTEM

(75) Inventors: Brent C. Stuart, Livermore, CA (US);
Lloyd A. Hackel, Livermore, CA (US);
Mark R. Hermann, Danville, CA (US);
James P. Armstrong, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1903 days.

(21) Appl. No.: 10/883,240

(22) Filed: Jun. 30, 2004

(65) Prior Publication Data
US 2006/0000988 A1 Jan. 5, 2006

(51) Int. Cl.
*G01C 3/08* (2006.01)
(52) U.S. Cl. ......... 356/4.01; 356/4.1; 356/5.01; 356/5.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | | |
|---|---|---|---|---|
| 4,552,456 | A * | 11/1985 | Endo | 356/5.06 |
| 5,119,385 | A | 6/1992 | Aoshima et al. | |
| 5,377,219 | A * | 12/1994 | Geiger | 372/97 |
| 5,579,103 | A * | 11/1996 | Tachikawa | 356/5.1 |
| 5,696,778 | A * | 12/1997 | MacPherson | 372/4 |
| 5,703,314 | A | 12/1997 | Meeker | |
| 5,742,384 | A | 4/1998 | Farmer | |
| 5,832,006 | A | 11/1998 | Rice et al. | |
| 5,877,851 | A * | 3/1999 | Stann et al. | 356/5.09 |
| 5,912,910 | A | 6/1999 | Sanders et al. | |
| 6,055,909 | A | 5/2000 | Sweeny | |
| 6,196,497 | B1 | 3/2001 | Lankes et al. | |
| H1965 | H | 6/2001 | Burns et al. | |
| 6,324,955 | B1 | 12/2001 | Andersson et al. | |
| 6,410,897 | B1 | 6/2002 | O'Neill | |
| 6,420,995 | B1 | 7/2002 | Richmond et al. | |
| 6,510,276 | B1 | 1/2003 | Jain et al. | |
| 6,587,486 | B1 | 7/2003 | Sepp et al. | |
| 6,626,396 | B2 * | 9/2003 | Secker | 244/3.16 |
| 6,662,700 | B2 | 12/2003 | O'Neill | |
| 6,707,052 | B1 * | 3/2004 | Wild et al. | 250/504 R |
| 6,825,791 | B2 * | 11/2004 | Sanders et al. | 342/14 |
| 2002/0080061 | A1 * | 6/2002 | Secker | 342/62 |
| 2003/0012491 | A1 | 1/2003 | Shaw et al. | |
| 2003/0063884 | A1 | 4/2003 | Smith et al. | |
| 2003/0152115 | A1 | 8/2003 | Jiang et al. | |
| 2003/0205126 | A1 | 11/2003 | O'Neill | |
| 2005/0185691 | A1 * | 8/2005 | Slater | 372/95 |

OTHER PUBLICATIONS

Laurenzo, R., "Company Proposes Ground Laser to Protect Jetliners," Defense Week, Jan. 20, 2004, 4 pages.
Erwin, Sandra L., "Man-Portable Missiles Imperil Both Military, Civilian Aircraft," National Defense Magazine, Aug. 2003, 4 pages.

* cited by examiner

*Primary Examiner* — Luke Ratcliffe
(74) *Attorney, Agent, or Firm* — Eddie E. Scott

(57) ABSTRACT

A countermeasure system for use by a target to protect against an incoming sensor-guided threat. The system includes a laser system for producing a broadband beam and means for directing the broadband beam from the target to the threat. The countermeasure system comprises the steps of producing a broadband beam and directing the broad band beam from the target to blind or confuse the incoming sensor-guided threat.

52 Claims, 14 Drawing Sheets

SENSOR-GUIDED THREAT COUNTERMEASURE SYSTEM

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a countermeasure system against sensor-guided threats and more particularly to a broadband laser countermeasure system against sensor-guided threats.

2. State of Technology

U.S. Pat. No. 5,703,314 to Delbert Brent Meeker for an infrared projector countermeasure system patented Dec. 30, 1997 provides the following state of technology information, "It is well known that current state of the art missiles have the capability of homing on targets, such as enemy aircraft, ships or other targets, which emit infrared energy. Generally, these missiles employ imaging seekers, which sense the infrared energy from the target, to track and then destroy the target. Generally, infrared radiation emitting decoy projectiles are used to deceive an incoming missile as to the location and heading of the target. These decoy projectiles are, for example, carried on targets such as aircraft or ships so that when the target's detection instruments detect the approach of an incoming missile equipped with an infrared search system a decoy projectile can be fired into the air. Subsequently, at a predetermined height and distance from the target, the decoy projectile will ignite and eject combustible flakes which burn and emit infrared radiation. These combustible flakes from the decoy form a burning interference cloud which descends slowly toward the earth's surface diverting the incoming missile toward the interference cloud and away from the target. Modern, imaging infrared seekers can distinguish between a localized, point source of radiation provided by a flare and the distributed, complex radiation pattern of an aircraft structure. This capability is one of the reasons for using an imaging infrared seeker on a missile when tracking an aircraft. When protection of very rapidly moving targets is involved, state of the art imaging infrared seekers used in missiles scan for multiple frequencies in the infrared region of the electromagnetic spectrum. This renders the decoy projectiles ineffective since the interference cloud generated by the projectiles or even a flare generally have a characteristic frequency spectrum which can be distinguished from that of an aircraft."

U.S. Pat. No. 6,196,497 to Simon Lankes et al. for an infrared seeker head for target seeking missile patented Mar. 6, 2001 provides the following state of technology information, "To defend against attacking target seeking missile, measures are taken by an attacked aircraft for causing interference in the infrared seeker head. Prior art infrared seeker heads for guided missiles usually have analog signal processing and use a reticle. To deceive the signal processing of such seeker heads, it is sufficient if a suitably modulated infrared radiation source, (infrared jammer) emits interfering radiation at the target site. This radiation source may be a laser with large beam divergence, or a plasma lamp, as a relatively small radiation level is sufficient to cause interference. Modern picture processing infrared seeker heads are no longer as easily deceived. An interference could be achieved, in which the laser radiation is focused on the approaching missile. Then by dazzling and even destruction of the infrared detector, the guidance of the missile could be totally interrupted and the missile would miss the thus protected target."

U.S. Pat. No. 6,324,955 for an explosive countermeasure device patented Dec. 4, 2001 provides the following state of technology information, "Anti-aircraft missiles have electro-optical seeker devices for homing in on the infrared or other wavelength radiation emitted from an aircraft engine tailpipe. Conventional flares are often used in attempting to decoy the seeker devices so that they lose their lock on the target, the aircraft being flown out of line of sight with the missile under the cover of the decoy flare. In conventional pyrotechnic flares, a mixture of chemicals contained in a cartridge is ignited after expelling the flare from the aircraft, forming an infrared source for decoying a hostile infrared seeking missile. The duration of such flares is from milliseconds to seconds in length. Such devices are quite well known and understood, and missile designers have developed means for enabling current missiles to ignore most of the existing flare countermeasures."

U.S. Pat. No. 6,410,897 to Mary Dominique O'Neill for a method and apparatus for aircraft protection against missile threats patented Jun. 25, 2002 provides the following state of technology information, "Missiles fired at aircraft are usually guided either by a light seeker or by radar. Of the various types of seekers, infrared light seekers pose some of the greatest problems to aircraft defense. Unlike radar seekers, infrared seekers are passive and do not emit a detectable signal prior to the firing of the missile. Pilots therefore have little warning of their presence prior to the firing of the missile. Infrared-guided missile systems are relatively inexpensive, and human-portable units are widely available. There has been a continuing effort to develop sensor systems and countermeasures that are carried on aircraft and are used to detect missile threats, particularly infrared-guided missiles, and take action against the missile threats. The sensor system must be effective to detect the infrared signature of a relatively small-sized missile at as great a distance as possible, in order to allow time for the countermeasure to be effective. In one approach, a wide-angle, two-color staring sensor system has been suggested to be particularly effective in detecting threats. This approach is limited by its low resolution and thence its ability to detect potential targets at great distances and susceptibility to smearing of the image, as well as the incomplete status of the detector technology. Additionally, the detection and warning components of the system must be integrated with the countermeasures components of the system."

U.S. Pat. No. 6,055,909 to Ray L. Sweeny for "Electronically Configurable Towed Decoy for Dispensing Infrared Emitting Flares," patented May 2, 2000 provides the following state of technology information, "Infrared-guided and radar-guided missiles pose the primary threats to military aircraft engaged in a combat environment. These missiles use their radar and IR guidance to home in on aircraft, thereby substantially increasing their probability of a 'hit.' Current military aircraft are particularly vulnerable to attack from IR-guided surface-to-air and air-to-air missiles. Statistics gathered from analysis of aircraft losses in hostile actions since 1980 show that almost 90% of these losses have been the result of IR-guided missile attacks. Thus, IR-guided missiles have become a formidable threat to military aircraft. These missiles can either be guided to their target entirely using IR-guidance or can initially utilize radar guidance and then switch over to IR guidance as they come into closer proximity to the target. In regards to the latter approach, IR-guided missiles can be cued via radar, or a passive Infrared Search and Track (IRST) system employed with the missiles can be alerted and properly oriented via a data link from a ground based surveillance or early warning radar. Optimally, however, IR-guided missiles are launched at an aircraft without the use of radar cueing, which often alerts an aircrew to an impending missile attack when the radar signals are detected by an on-board radar warning receiver. These IR-guidance only missiles are essentially passive and can be launched as a result of visual observation of the approaching aircraft, via self cueing or with assistance from an IRST system. In the absence of warning to the target aircraft, these missiles have a high degree of lethality."

U.S. Pat. No. 6,662,700 to Mary Dominique O'Neill for "Method for Protecting an Aircraft Against a Threat that Utilizes an Infrared Sensor," patented Dec. 16, 2003 provides the following state of technology information, "Threats against military aircraft, such as air-launched or ground-launched missiles, are typically guided by a radar sensor, an infrared sensor, or both. Radar sensors are highly accurate in identifying and locating their targets. They have the disadvantage that they are active devices that emit radar signals, and their emissions may be detected by the target and used to evade or to launch a counter-attack against the radar source. Infrared sensors, on the other hand, are passive devices that do not reveal their presence or operation. The great majority of aircraft losses to hostile attacks over the past 20 years have been to infrared-guided missiles. In most cases, the pilots of the aircraft that were shot down were not aware that they were under attack until the infrared-guided missile detonated. Infrared-guided missiles have the disadvantage that they typically must be initially positioned much more closely to their potential targets in order for the infrared sensor of the missile to be effective, as compared with a radar-guided missile. The fields of view of the infrared sensors are usually quite narrow, on the order of a few degrees. In most cases, the infrared sensor must therefore acquire its potential target prior to launch of the missile and remain 'locked onto' the target for the entire time from launch until intercept. If the acquisition is lost during the flight of the missile, it is usually impossible to re-acquire the target without using an active sensor that warns the target of its presence. There are a number of countermeasures to defeat infrared-guided missiles. Historically, the most common countermeasure has been the use of flares that produce false signals to confuse the infrared sensor. The current generation of infrared-guided missiles utilizes counter-countermeasures programmed to ignore flares, based upon distinguishing features of the flares such as their different motion than the previously acquired target and/or their different heat-emitting properties as compared with the previously acquired target. Lamps and directional lasers may be used to blind or confuse the infrared sensor, but these approaches have drawbacks in respect to size, weight, complexity, and power requirements."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Aircraft operators fear heat-seeking missiles because the energy from infrared guided weapons often cannot be detected by the targeted aircraft. The use of infrared guided missiles to attack military aircraft is well known. The proliferation of infrared guided missile systems has generated concern that such weapons will also be used by terrorists against commercial aircraft. Existing countermeasures for protecting aircraft against infrared seeking missiles include laser sources that are susceptible to simple counter-countermeasures such as band pass filters.

The present invention provides a countermeasure system for use by an aircraft to protect against an incoming missile. The system includes a laser system for directing a broad band infrared beam and means for directing the broad band infrared beam from the aircraft. The countermeasure system comprises the steps of producing a broad band infrared beam and directing the broad band infrared beam from the aircraft to blind or confuse the incoming missile.

More generally, the present invention provides a broadband laser countermeasure system to protect any target against a sensor-guided threat. The broadband laser radiation is designed to blind, confuse, or destroy the threat sensor guidance system. Broad bandwidth laser light is essential to cover the maximum number of spectral windows in which the threat sensor may be operating, and to prevent easy use of spectral filter counter-countermeasures.

In one embodiment the laser system produces a broadband infrared beam in the mid infrared range (1500-5000 nm). In another embodiment the laser system produces a broadband infrared beam covering multiple spectral windows in the near and mid IR ranges (700-5000 nm). In another embodiment the laser system is frequency converted to add additional broadband coverage in the UV, Visible, and near IR ranges (200-1500 nm). In another embodiment the laser system is frequency converted to add additional broadband coverage in the far IR ranges (5-14 microns). In another embodiment the laser system produces 0.1-10000 ps pulses. In another embodiment the laser system produces mid-wave IR region pulses spanning 1.5-5 microns. In another embodiment the laser system produces UV, Visible, near- and mid-wave IR region pulses spanning 0.2-5 microns.

In one embodiment the laser system contains a Thulium doped pulsed fiber laser system. In another embodiment the laser system contains a Ytterbium doped pulsed fiber laser system. In another embodiment the laser system contains an Erbium doped pulsed fiber laser system. In another embodiment the laser system contains a combination of two or more Thulium, Erbium, or Ytterbium doped pulsed fiber laser system.

In one embodiment the laser system contains an optical parametric amplifier. In another embodiment the laser system contains multiple optical parametric amplifiers. In another embodiment the laser system contains a cascaded optical parametric amplifier. In another embodiment the laser system contains a multiband optical parametric amplifier.

In one embodiment the laser system contains a broadband frequency generator which produces broadband (>50 nm) output from a narrower bandwidth input.

In one embodiment the laser system contains frequency conversion to produce UV, visible and near-IR light (200-1500 nm) from near- and mid-IR light. In another embodiment the laser system contains frequency conversion to produce far-IR (5-14 micron) light from near- and mid-IR light.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
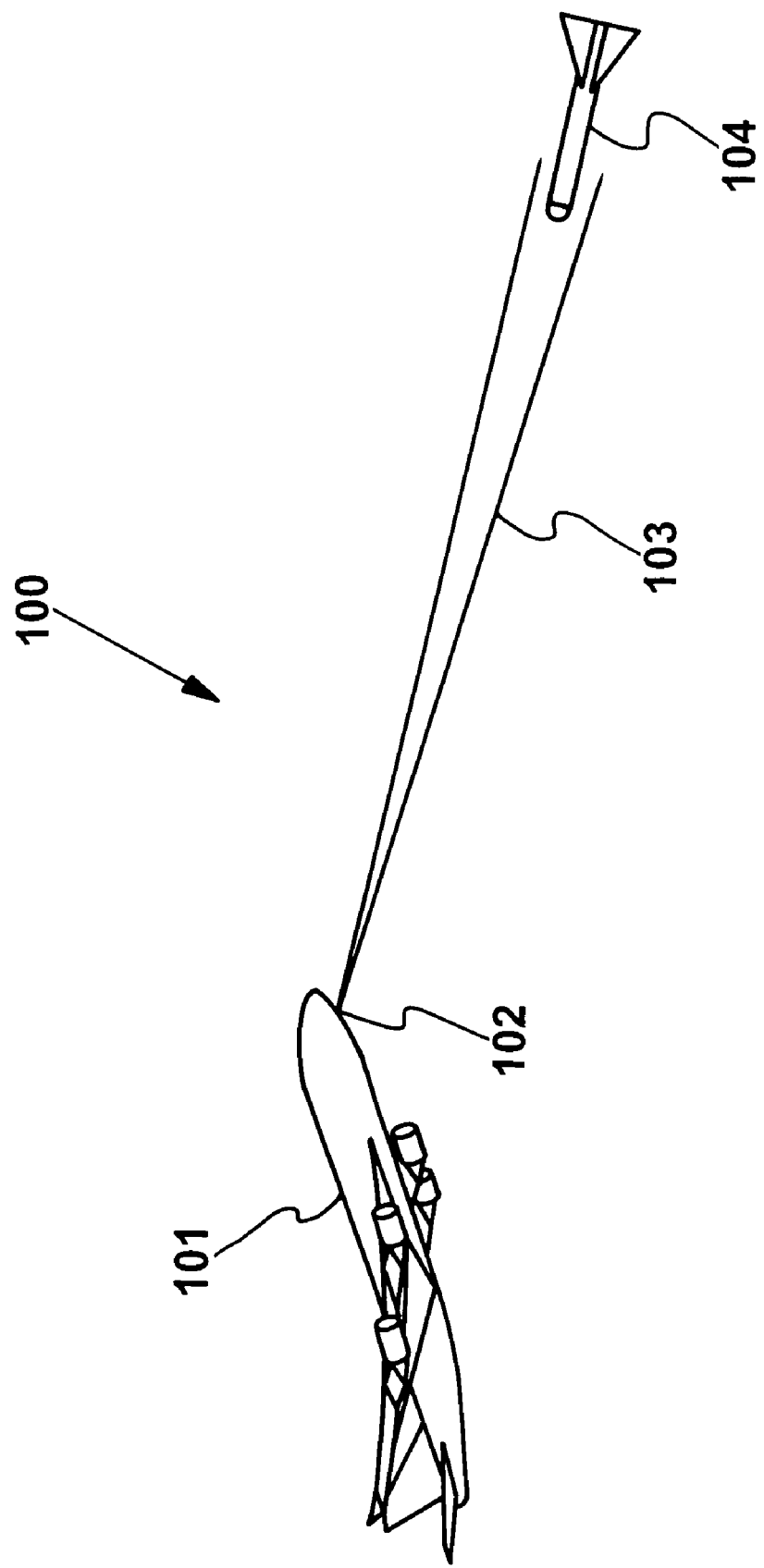
FIG. 1 illustrates an embodiment of an aircraft countermeasure system incorporating the present invention.

The feature article in *National Defense Magazine* August 2003, is titled, "Man-Portable Missiles Imperil Both Military, Civilian Aircraft." The article states, "Shoulder-fired missiles remain a menace to U.S. military aircraft operating in Afghanistan and Iraq, even though the threat has been downgraded from high, to moderate said Air Force Gen. John W. Handy, head of the U.S. Transportation Command. . . . Manpads most often are heat-seeking missiles, employing sensors that home in on the targets infrared signature, such as the engine. Aircraft operators fear heat-seeking missiles mainly because the energy from IR-guided weapons often cannot be detected by the targeted aircraft. . . . The Bush administration set up a special panel to assess the vulnerability of U.S. airliners, and Congress has sponsored legislation, asking the Department of Homeland Security to address the problem and figure out how to best protect commercial aircraft. . . . The Congressional Research Service report, meanwhile, noted that 'no single solution exists to effectively mitigate the SAM threat to airliners.' Instead, a menu of options may be considered, said CRS, including improvements or modifications to commercial aircraft, changes to pilot training and air traffic control procedures, and improvements to airport and local security."

The present invention provides a countermeasure system to a sensor-guided aircraft, seacraft, or landcraft threat. The term "aircraft" is used in the broadest possible sense and is intended to include airplanes, missiles, rockets, and other air borne vehicles. Likewise seacraft and landcraft are intended to include all water and land craft threats that are guided by sensors. Sensors include all single and multielement devices that collect and use light in the UV to far IR (0.2-14 micron) range for guidance. The countermeasure system may be used to protect other aircraft, seacraft, landcraft, spacecraft, or fixed installations. For purposes of example, the following detailed description refers to a countermeasure system for protection of airplane against IR seeking missiles.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Shoulder-fired missiles (Manpads) are a menace to United States Aircraft. Manpads most often are heat-seeking missiles, employing sensors that home in on the targets infrared signature, such as the engine. Aircraft operators fear heat-seeking missiles mainly because the energy from IR-guided weapons often cannot be detected by the targeted aircraft. The use of infrared (IR) guided missiles to attack military aircraft is well known. The proliferation of IR guided missile systems has generated much concern that such weapons will also be used by terrorists against commercial aircraft.

Existing counter measures for protecting aircraft against infrared seeking missile include a variety of heat emitting decoy (flares) systems but they have many disadvantages. Active directional infrared countermeasure (DIRCM) systems using lamp and laser sources have been developed for military assets. Lamp sources such as Northrop-Grumman's AN/AAQ-24 (V) NEMESIS system suffer from limited brightness on target and limited spectral power in the 3-5 micron regime. Laser sources such as Northrop-Grumman's AN/AAQ-24 (V) Viper system offer significant improvements but are expensive and complex and produce narrow band output that are susceptible to simple counter-countermeasures such as band pass filters.

The aircraft countermeasure system of the present invention provides broad band output. The aircraft countermeasure system of the present invention generates mid IR wavelength bands that are optimized for atmospheric transmission. The aircraft countermeasure system of the present invention has use as an active MWIRCM system for aircraft against MANPADS threats.

Referring to FIG. 1, an embodiment of an aircraft countermeasure system incorporating the present invention is illustrated. The system is designated generally by the reference numeral 100. The countermeasure system 100 is adapted for use on board an aircraft 101, for confusing an incoming missile 104. The aircraft countermeasure system 100 includes a system 102 for directing at least one beam of energy 103 from the aircraft.

The system 102 is a laser system that produces a beam of energy 103 that is mid IR optimized for atmospheric transmission windows and uses short picosecond pulses (0.1-999 ps) to drive nonlinear processes required to convert near IR wavelength telecom fiber laser output to the mid IR (1800-5000 nm) and to generate broad band output. The laser system produces a beam of energy 103 covering the near and mid IR range (700-5000 nm). The system can also provide coverage throughout the UV and visible range (200-1000 nm) by frequency conversion of the near and mid IR output.

The countermeasure system includes a system for generating broadband output from narrower bandwidth input through nonlinear processes. These nonlinear broadband generators consist of tapered, microstructure, or other fiber or bulk components that produces sufficient intensity and nonlinear interaction to create a broadband (>50 nm) output spectrum.

The aircraft countermeasure system 100 comprises a laser source 102 that serves as a directional infrared countermeasure (DIRCM). The laser source 102 has one or more specific advantages over alternative DIRCM sources. Example of the one or more specific advantages over alternative DIRCM sources include: (1) the system generates bandwidth that is optimized for the different seeker bands and atmospheric transmission windows producing more power on target, (2) broad band output (>50 nm) is generated resulting in a more robust system, (3) it uses high production volume and hence low cost telecom fiber laser components resulting in a more robust and less expensive system, (4) the system design may include fiber coupling to the point and track system permitting smaller transmitter optics footprint for improved aircraft performance (drag) and easier airframe integration, (5) the system uses passive parametric amplifiers instead of complex parametric resonator cavities to produce the mid IR wavelengths resulting in a less complex and more robust system, (6) it consists of only one laser oscillator, (7) it consists of only one optical parametric amplification (OPA) stage, or a minimal number of OPA stages, and (8) it can produce broadband wavelength output from 0.2-14 microns for use against future actively aimed missile threats.

The aircraft countermeasure system 100 comprises a fiber laser source providing a directional infrared countermeasure (DIRCM) aircraft protection system based on a short pulse fiber lasers. The system 100 is designed to be low cost and meet required performance specifications suitable for military and/or commercial aircraft integration. The broadband multi-line IR laser system (MIRLS) uses high production volume telecom fiber components to produce a low cost system compared to conventional bulk lasers. The system 100 uses short laser pulses (0.1-10000 ps) to drive nonlinear processes required to convert near IR wavelength telecom fiber laser output to the mid IR (1800-5000 nm) and to generate broadband output to produce a robust countermeasure system.

The laser 102 is a fiber laser designed to produce output power in the near and mid-wave IR region spanning 0.6-5 microns and located at atmospheric transmission windows. Specific bands of interest included ~2.2 micron, ~3.5 micron and ~4 micron. The laser 102 is designed to produce output at or near these wavelengths from a single output coupler. Alternatively, multiple outputs are employed if more convenient for system architecture.

Figure 2:
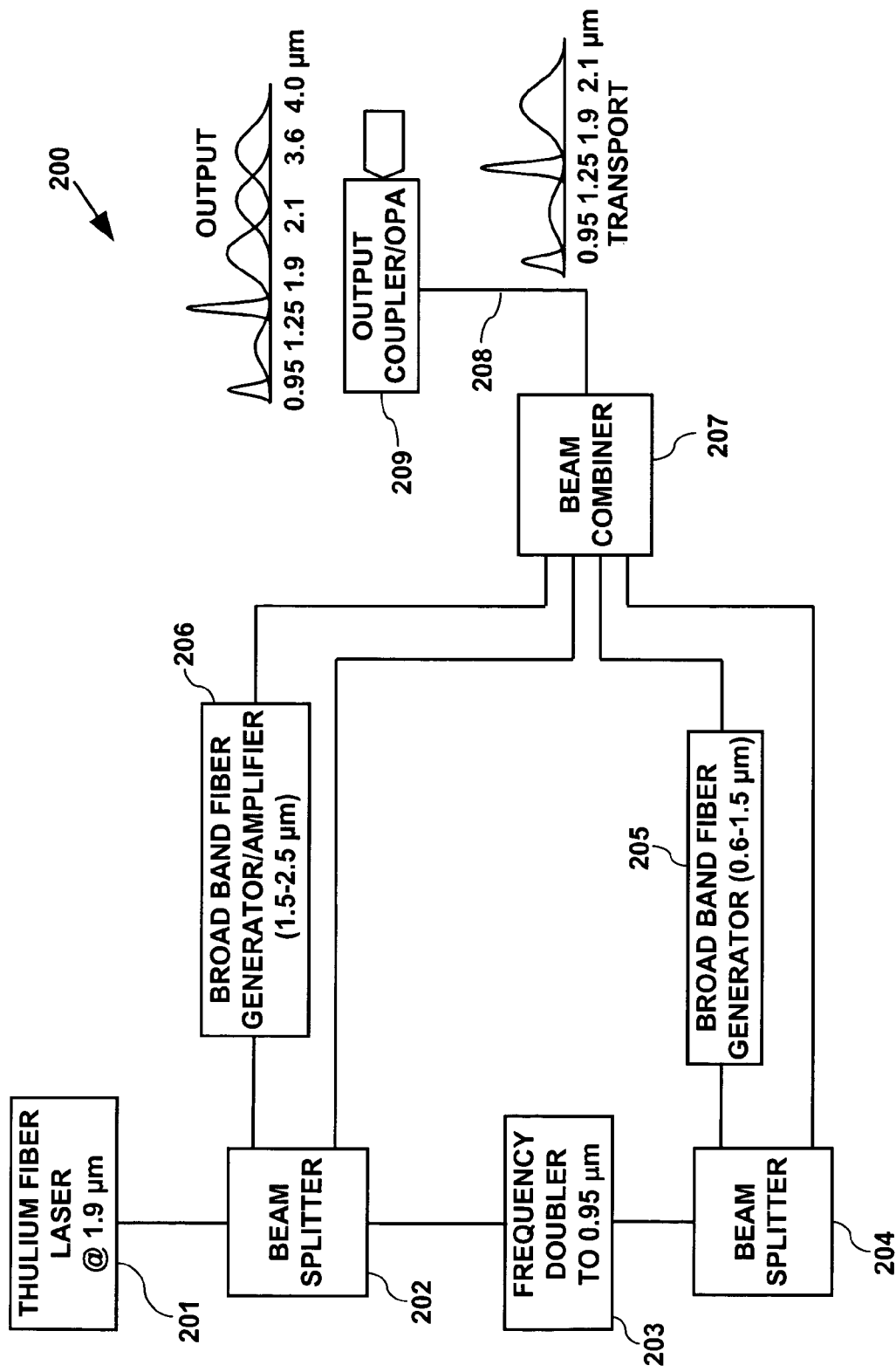
FIG. 2 shows additional details of the aircraft countermeasure system of FIG. 1.

Referring now to FIG. 2, one embodiment of an aircraft countermeasure system constructed in accordance with the present invention is illustrated. The system is designated generally by the reference numeral 200. The aircraft countermeasure system 200 comprises a laser source that serves as a directional infrared countermeasure (DIRCM) based on Thulium doped short pulse fiber lasers. The Thulium doped fiber lasers provide a DIRCM for protecting aircraft against infrared seeking missiles. The countermeasure system 200 is adapted for use on board an aircraft, for confusing an incoming missile. The aircraft countermeasure system 200 includes a system for directing at least one beam of energy from the aircraft.

In countermeasure system 200, a Thulium doped mode locked short pulse fiber laser 201 produces 0.1-10000 ps pulses at a wavelength of 1.9 microns. Alternatively, the 1.9 micron pulses are produced in Erbium or Ytterbium fiber oscillators, or other conventional oscillators and frequency shifted to 1.9 microns. Further thulium doped amplifiers are used to boost the output to the desired power and energy level. Beam splitter 202 splits the 1.9 micron output and sends it to the broadband fiber generator/amplifier 206, the OPA 209, and the frequency doubler 203. The frequency doubler subsystem 203 converts the 1.9 micron light to 0.95 micron. The doubler 203 consists of periodically poled nonlinear crystals such as lithium niobate, KTP, KTA, RTA or other crystals. The beam splitter 204 splits the 0.95 micron output and sends it to the OPA 209 and the broad band fiber generator 205.

A length of fiber 205 generates a broadband output to around 1.25 microns from the 0.95 micron seed. A length of fiber/amplifier 206 generates a continuum from the 1.9 micron pump followed by Thulium amplifier to amplify the output to sufficient energy and power at >2 microns.

A beam combiner 207 is used to combine the 1.9 micron pump, the 0.95 micron pump, the 1.245 micron broad band seed and the >2 micron output. A length of fiber 208 or free space transports the wavelengths to a dual crystal cascaded optical parametric amplifier (OPA) 209. The OPA 209 utilizes periodically poled nonlinear crystals (lithium niobate, KTP, KTA, RTA or other crystals). Additional frequencies in the UV, visible, and IR range are generated as desired by appropriate frequency conversion and broadening of the laser system 200 outputs.

Figure 3:
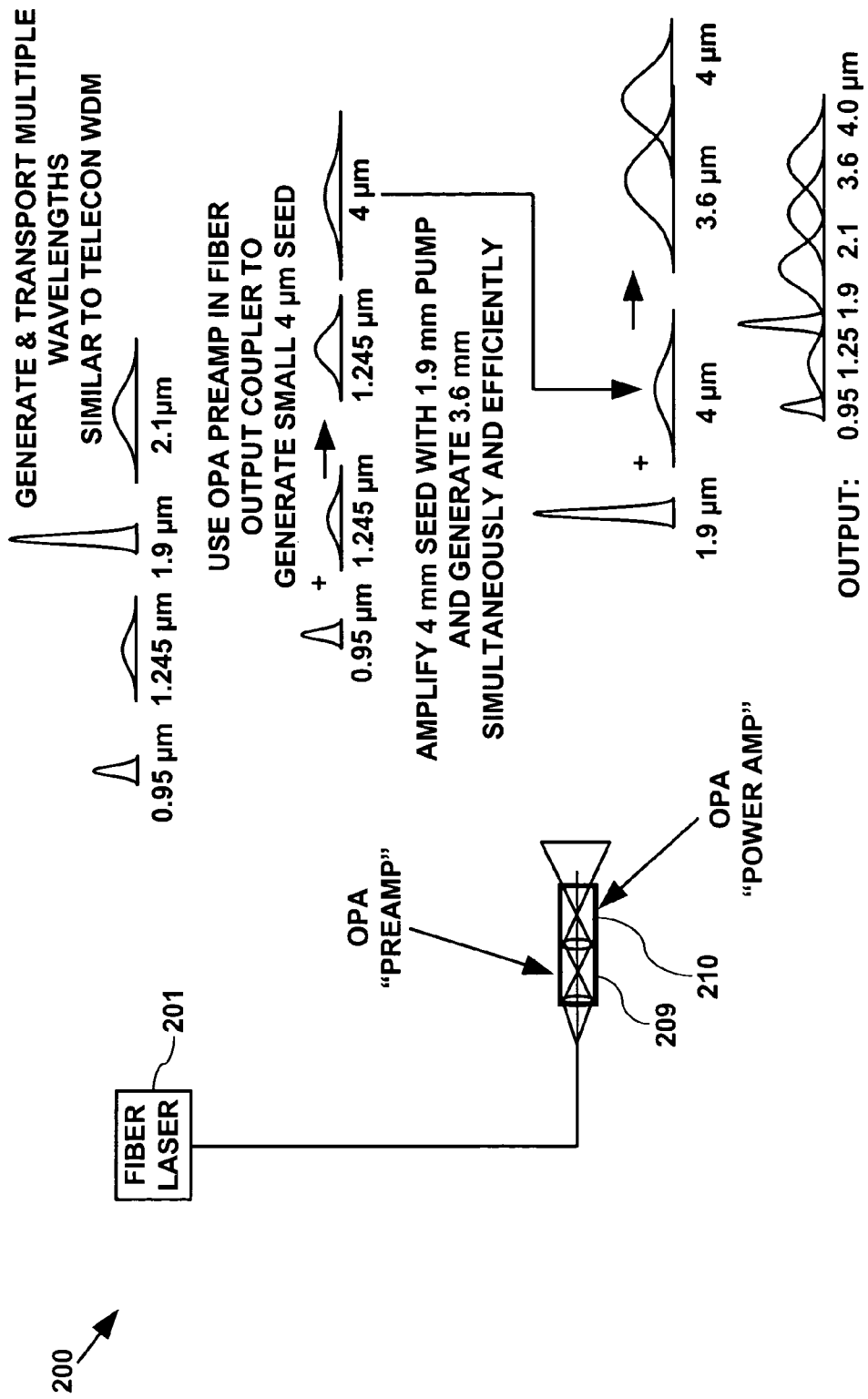
FIG. 3 shows additional details of the system of FIG. 2.

Referring now to FIG. 3, additional details of the system 200 are shown. The cascaded OPA 209 first generates a 4 micron seed by optical parametric mixing of the 0.95 and 1.25 micron inputs. In the second OPA 210 the 1.9 micron pump amplifies the 4 micron seed and generates 3.6 microns. The output consists of the 0.95 and 1.9 micron pumps and the broadband outputs centered near 1.25, 2.1, 3.6, and 4 microns, providing broad spectral coverage over the near and mid IR region. In addition, the OPA subsystem has suitable focusing and beam formatting optics for all of the wavelengths.

Figure 4:
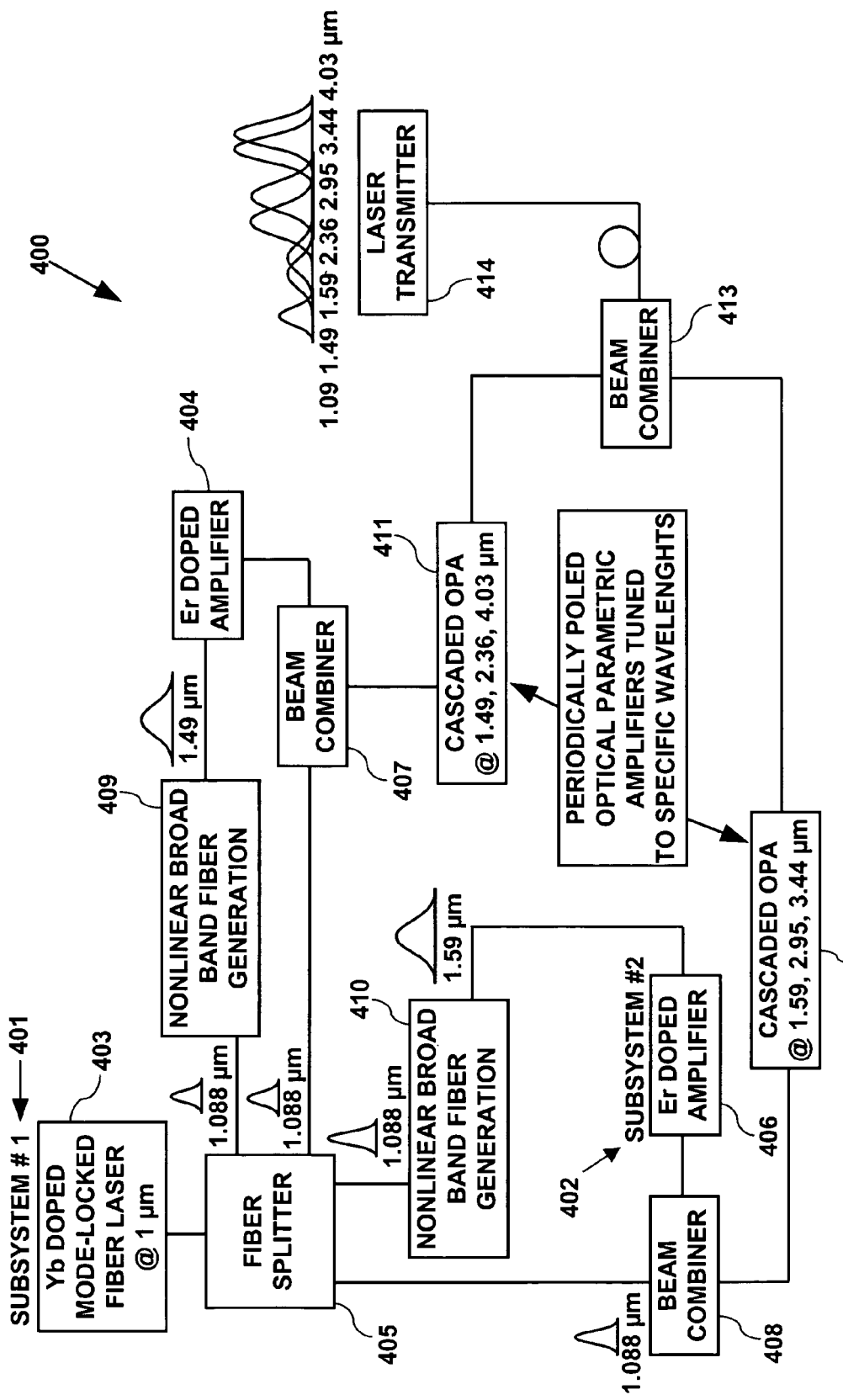
FIG. 4 illustrates another embodiment of an aircraft countermeasure system incorporating the present invention.

Referring now to FIG. 4, another embodiment of an aircraft countermeasure system constructed in accordance with the present invention is illustrated. The system is designated generally by the reference numeral 400. The aircraft countermeasure system 400 comprises a laser source that serves as a directional infrared countermeasure (DIRCM) based on Ytterbium doped short pulse fiber lasers. The Ytterbium doped fiber lasers provide a DIRCM for protecting aircraft against infrared seeking missiles. The countermeasure system 400 is adapted for use on board an aircraft, for confusing an incoming missile. The aircraft countermeasure system 400 includes a system for directing at least one beam of energy from the aircraft.

The system 400 consists of Subsystem #1 identified by the reference numeral 401 and Subsystem #2 identified by the reference numeral 402. The laser system uses fiber lasers designed to produce output power in the near and mid-wave IR region spanning 1-5 microns and located at atmospheric transmission windows. Specific bands of interest included ~2.2 micron, ~3.5 micron and ~4 micron. These outputs may be frequency converted to cover the UV-visible (200-1000 nm) spectral regions. The laser system is designed to produce output at or near these wavelengths from a single output coupler.

A Ytterbium doped mode locked ultra short pulse fiber laser 403 produces 0.1-10000 ps pulses at a wavelength of 1.088 microns. Alternatively, the 1.088 micron output may be produced in erbium or thulium fiber oscillators or other conventional oscillators and frequency converted to 1.088 microns. Further amplification to the desired power and energy level is achieved in ytterbium doped fiber amplifiers. Beam splitter 405 splits the ~1.088 micron output into a small seed for fiber broad band generators 409 and 410 and into pump beams for OPAs 411 and 412. A length of fiber generates a broad band output to around 1.49 microns for the laser subsystem #1 and 1.59 microns for the laser subsystem #2. Alternatively, the 1.49 and 1.59 micron output is generated from 1.088 microns by first Raman shifting to the 1.5 micron region and then broadening the spectrum in a nonlinear broadband fiber generator. An erbium fiber amplifier 404 and 406 is used to boost the output to the desired power and energy level. Beam combiners 407 and 408 combine the 1.088 micron pumps with the 1.49 micron and 1.59 micron seeds. The cascaded OPA 411 for the 1.088+1.49 micron laser subsystem #1 first amplifies the 1.49 micron seed and generates a 4 micron seed by optical parametric amplification from the 1.088 micron pump. In the second stage of cascaded OPA 411 the 1.49 micron acts as a pump to amplify the 4 micron seed and generates 2.36 microns. The cascaded OPA 412 for the 1.088+1.59 micron laser subsystem #2 first amplifies the 1.59 micron seed and generates a 3.44 micron seed by optical parametric amplification from the 1.088 micron pump. In the second stage of cascaded OPA 412 the 1.59 micron acts as a pump to amplify the 3.44 micron seed and generates 2.95 microns. The Laser system 400 output consists of the 1.088 pump light and the broadband outputs at 1.49, 1.59, 2.36, 2.95, 3.44, and 4.03 microns producing broad spectral coverage throughout the near and mid IR spectral regions. Additional frequencies in the UV, visible, and IR range are generated as desired by appropriate frequency conversion and broadening of the laser system 400 outputs. In addition, the OPA subsystem has suitable focusing and beam formatting optics for all of the wavelengths.

A length of fiber (such as chalcogenide, hollow, microstructure, or suitable replacement) transports the multiple wavelengths to the beam combiner 413. The beam combiner 413 combines the outputs from laser subsystem #1 (1.088, 1.49, 2.36, 4 micron) and laser subsystem #2 (1.088, 1.59, 2.95, 3.44 micron). A length of fiber (such as chalcogenide, hollow, microstructure, or suitable replacement) transports the wavelengths to the laser transmitter 414 and broadens the outputs. Alternatively, transport is in free space or multiple output beams are provided as required by system architecture.

Figure 5:
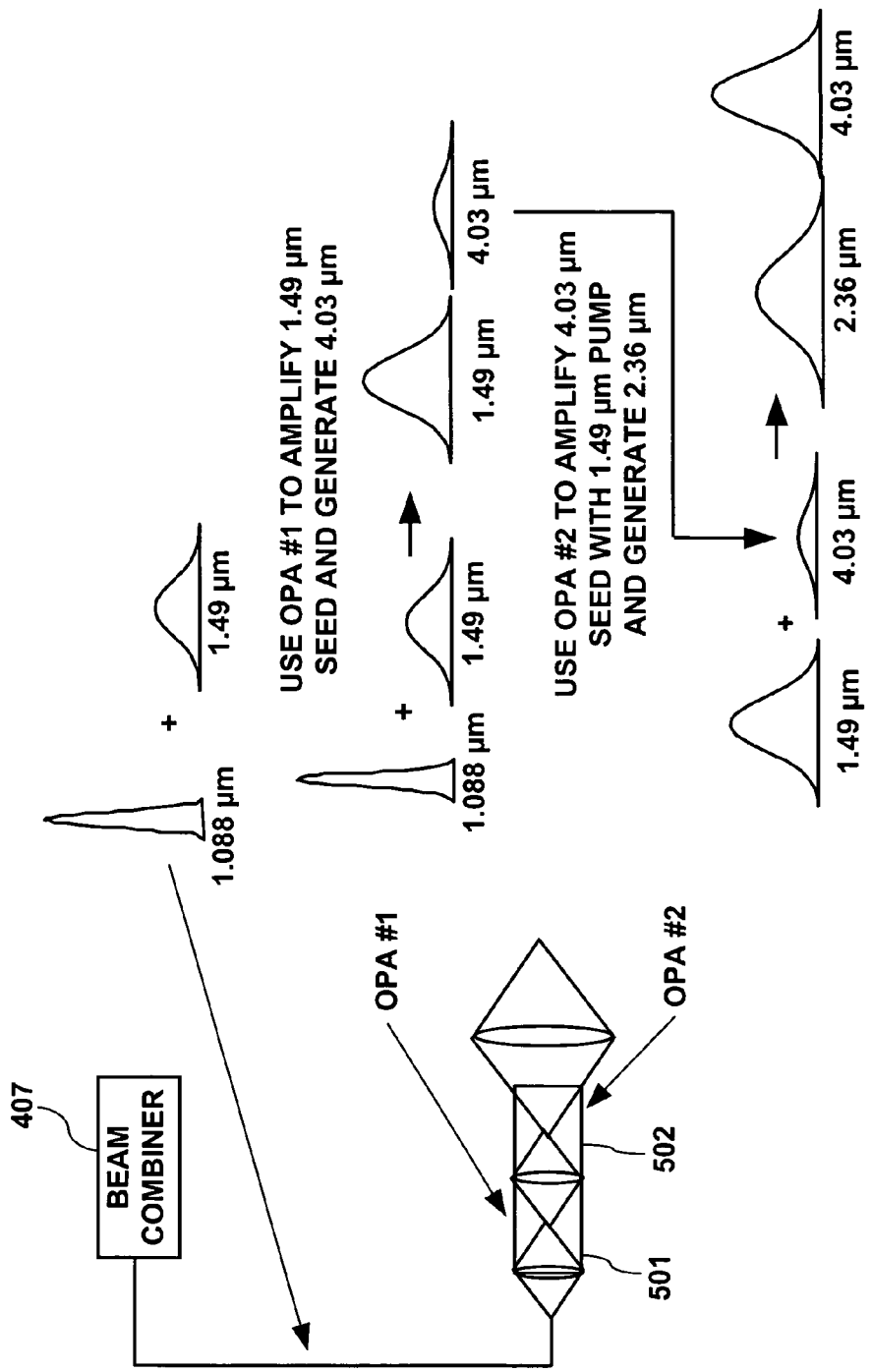
FIG. 5 shows additional details of the aircraft countermeasure system of FIG. 4.

Referring now to FIG. 5, additional details of the OPA 411 of subsystem #1 401 of system 400 are shown. The beam combiner 407 combines the 1.088 micron pump and broadband 1.49 micron seed. These outputs are transported to cascaded OPA 411 which consists of the two stages OPA #1 501 and OPA #2 502. In OPA #1, 501 the 1.49 micron broadband seed is amplified and a 4.0 micron broadband output is generated. In OPA #2, the 4.0 micron seed is amplified by the 1.49 micron pump and produces broadband 2.36 micron output.

Figure 6:
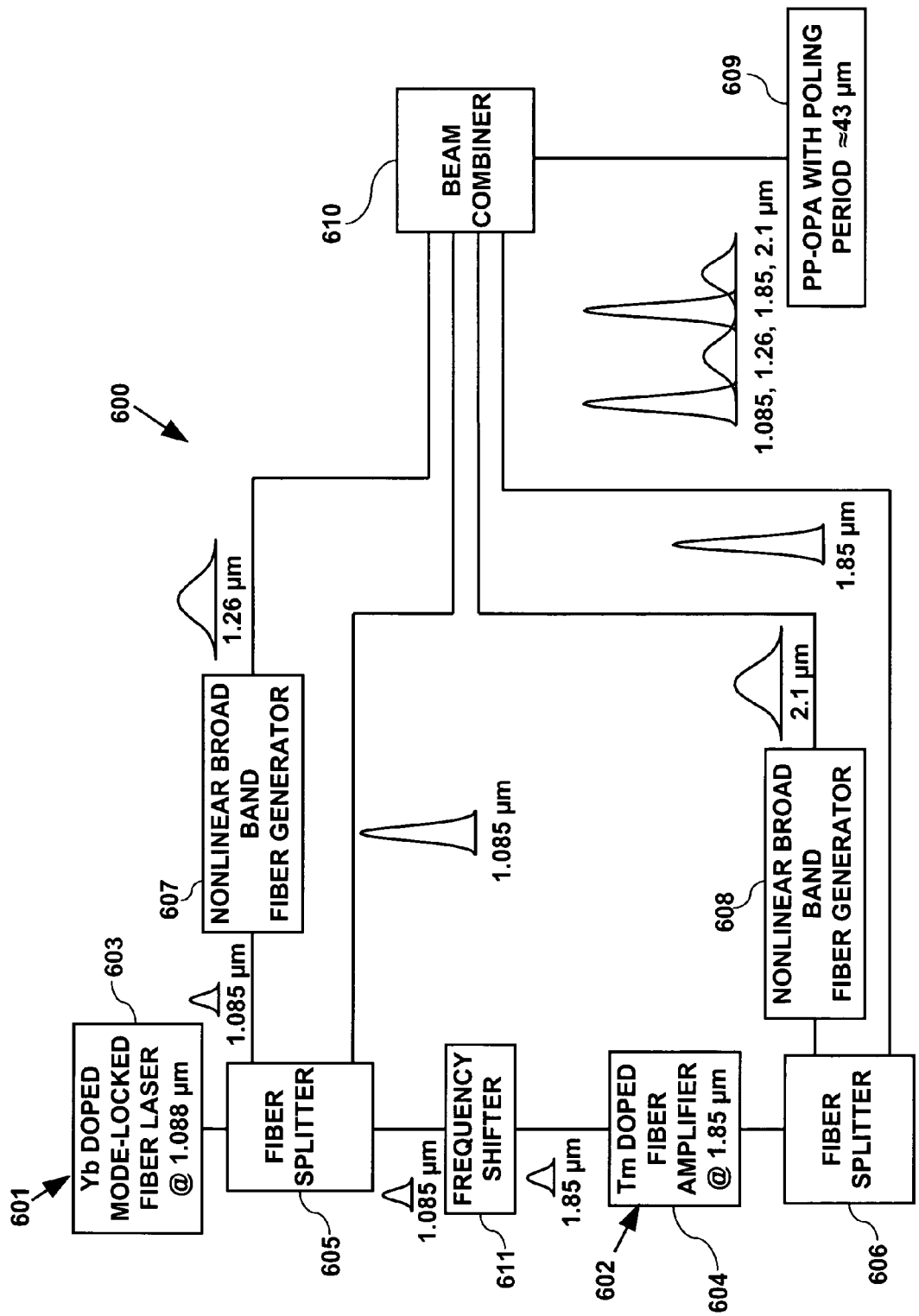
FIG. 6 illustrates another embodiment of an aircraft countermeasure system incorporating the present invention.

Referring now to FIG. 6, another embodiment of an aircraft countermeasure system constructed in accordance with the present invention is illustrated. The system is designated generally by the reference numeral 600. The aircraft countermeasure system 600 comprises a laser source that serves as a directional infrared countermeasure (DIRCM) based on Thulium and Ytterbium doped short pulse fiber lasers. The Thulium and Ytterbium doped fiber lasers provide a DIRCM for protecting aircraft against infrared seeking missiles. The countermeasure system 600 is adapted for use on board an aircraft, for confusing an incoming missile. The aircraft countermeasure system 600 includes a system for directing at least one beam of energy from the aircraft.

The system 600 uses Laser Subsystem #1 identified by the reference numeral 601 and Laser Subsystem #2 identified by the reference numeral 602. The laser system uses fiber lasers designed to produce output power in the mid-wave IR region spanning 1.5-5 microns and located at atmospheric transmission windows. Specific bands of interest included ~2.2 micron, ~3.5 micron and ~4 micron. The laser system is designed to produce output at or near these wavelengths from a single output coupler.

A Ytterbium doped mode locked ultra short pulse fiber laser 603 produces 0.1-999 ps pulses at a wavelength of 1.085 microns. A frequency shifter 611, such as a Raman frequency shifter or broadband continuum generator, converts the 1.085 micron output to 1.85 microns to seed a Thulium doped fiber laser 604 and produce 0.1-999 ps pulses at a wavelength of 1.85 microns. Alternate schemes to produce the 1.085 and 1.85 micron output include (1) thulium doped mode locked fiber oscillator frequency shifted to 2.17 microns and frequency doubled to produce 1.085 microns, then amplified in Yb doped fiber amplifier, (2) Erbium doped mode locked fiber oscillator frequency shifted to 1.85 and 2.17 microns and the 2.17 micron output frequency doubled to 1.085 microns and amplified, (3) Ytterbium doped mode locked oscillator produces 1.085 microns, which is frequency converted (Raman, continuum generation) to 1.5 microns, amplified in Erbium doped amplifier, then frequency shifted to 1.85 microns and amplified in Thulium doped fiber, (4) Ytterbium doped mode locked oscillator produces 1.085 microns and a Thulium doped mode locked oscillator produces 1.85 microns, with the timing of the lasers locked so that the pulse overlap in time.

Beam splitters 605 and 606 split the 1.085 and 1.85 micron outputs into small seeds for the fiber broadband generators 607 at 1.26 microns and 608 at 2.1 microns and the majority for the multi band optical parametric amplifier (OPA) 609. A beam combiner 610 combines the 1.085 micron Ytterbium pump, 1.85 micron Thulium pump, the 1.26 micron broadband seed and the 2.1 micron broadband seed. The OPA 609 creates additional broadband output at 2.25, 3.45, and 4 microns. The output consists of broad spectral coverage throughout the near and mid IR including the pumps at 1.085 and 1.85 microns and the broadband outputs at 1.26, 2.1, 2.25, 3.45, and 4 microns. Additional frequencies in the UV, visible, and IR range are generated as desired by appropriate frequency conversion and broadening of the laser system 600 outputs. In addition, the OPA subsystem has suitable focusing and beam formatting optics for all of the wavelengths.

Figure 7:
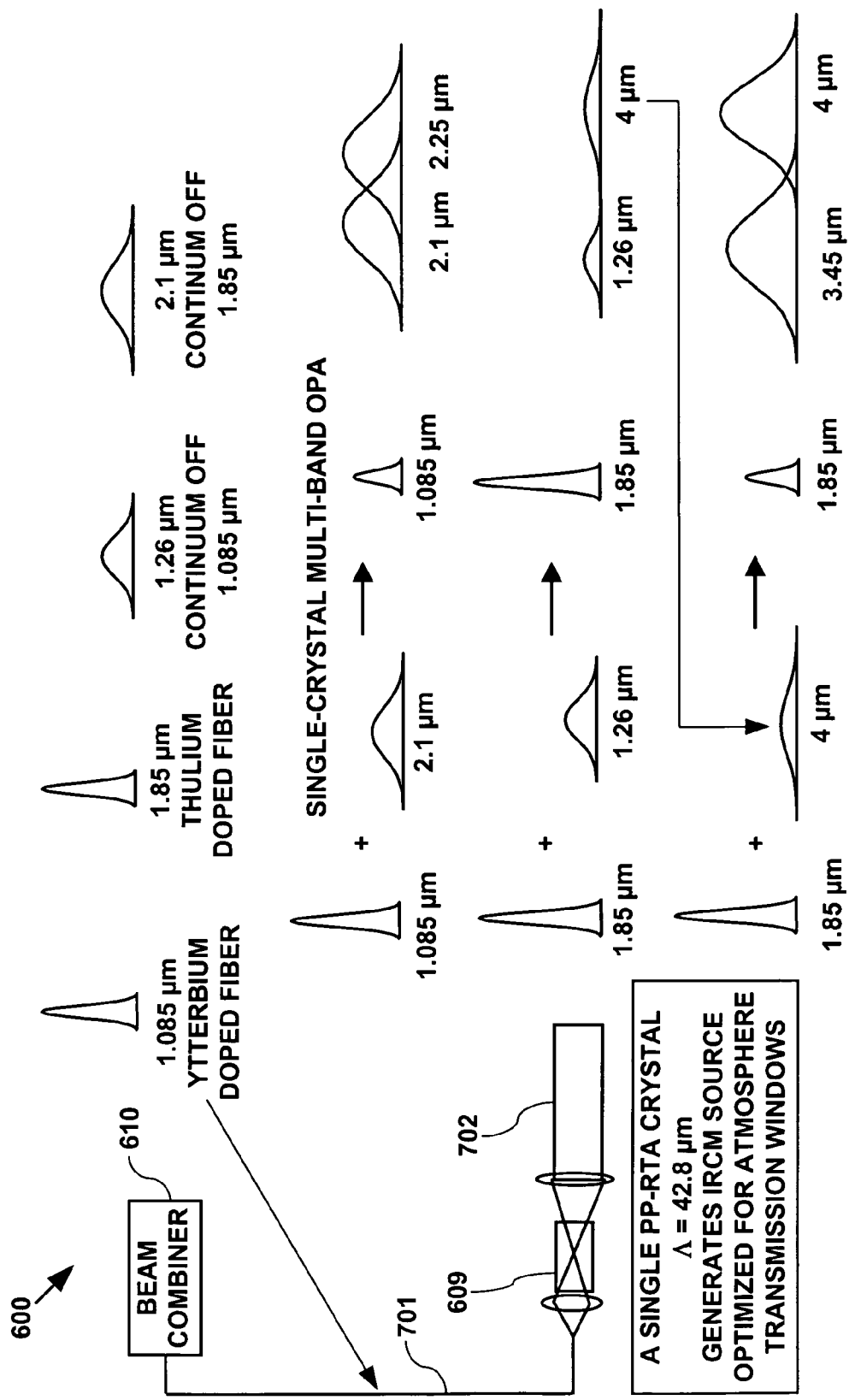
FIG. 7 shows additional details of the aircraft countermeasure system of FIG. 6.

Referring now to FIG. 7, additional details of the system 600 are shown. A length of fiber 701 or free space transports the wavelengths to the optical parametric amplifier 609 and the laser transmitter 702. A multi band periodically poled optical parametric amplifier 702 consists of RTA (RbTiO-AsO4) with a poling period of approximately 43 microns. The poling period is tuned either through poling process or temperature tuning so as to phase match the following three wave mixing processes: (i) 1.085 micron, 2.1 micron and 2.25 micron, (ii) 1.85 micron, 1.26 micron, 4 micron, and (iii) 1.85 micron, 3.45 micron, 4 micron. RTA is one example of a crystal that has the correct index of refraction for these pump sources and signal and idler wavelengths to quasi phase match with a single poling period of 43 microns. In the OPA 702, (1) the 2.1 micron seed is amplified by the 1.085 micron pump, creating 2.25 micron output, (2) the 1.26 micron broadband seed is amplified by the 1.85 micron pump, creating broadband 4 micron output, and (3) the broadband 4 micron seed is amplified by the 1.85 micron pump, creating 3.45 micron output.

Figure 8:
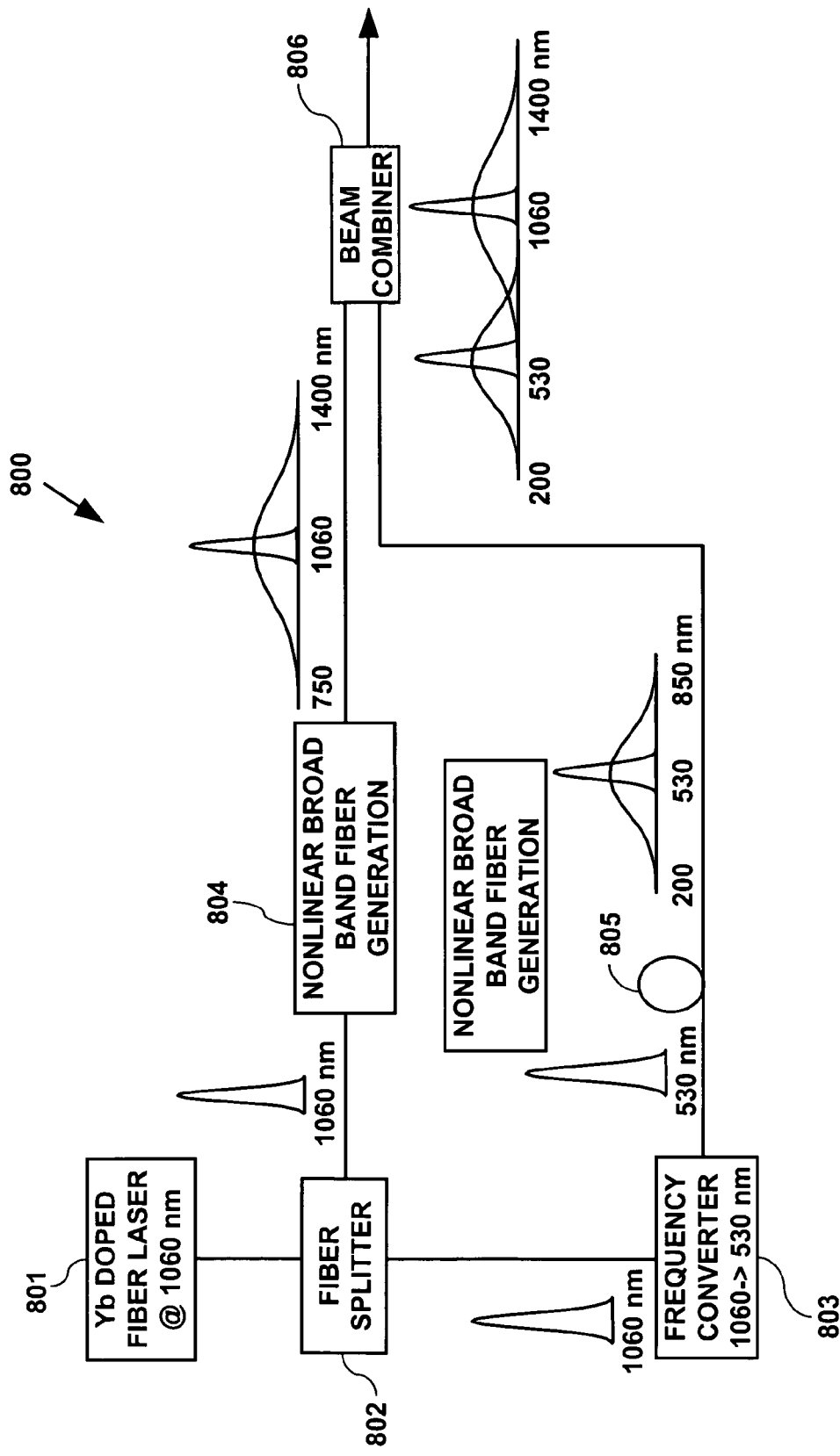
FIG. 8 shows details of additional spectral coverage in the UV, visible, and near-IR spectral region included in the present invention.

Referring now to FIG. 8, a system to produce countermeasure spectral coverage over the UV and visible spectral ranges is described. One or more stages of broadband generator is combined with one or more fundamental beams and frequency conversion to provide the desired coverage. The system 800 provides one of many possible system of producing coverage in the UV, visible, and near-IR regions. A ytterbium-doped fiber amplifier 801 produces output at 1060 nm. Beam splitter 802 splits the output and one leg is converted to 530 nm in frequency converter 803, in this case using second harmonic generation. Each leg is sent through a broadband generator 804 and 805 and then the beams combined in 806 to produce broadband output covering 200-1400 nm. Alternatively, the amplifier 801 output can be frequency converted and both the converted 530 nm beam and residual 1060 nm beam can be broadened in the same broadband generator.

Figure 9:
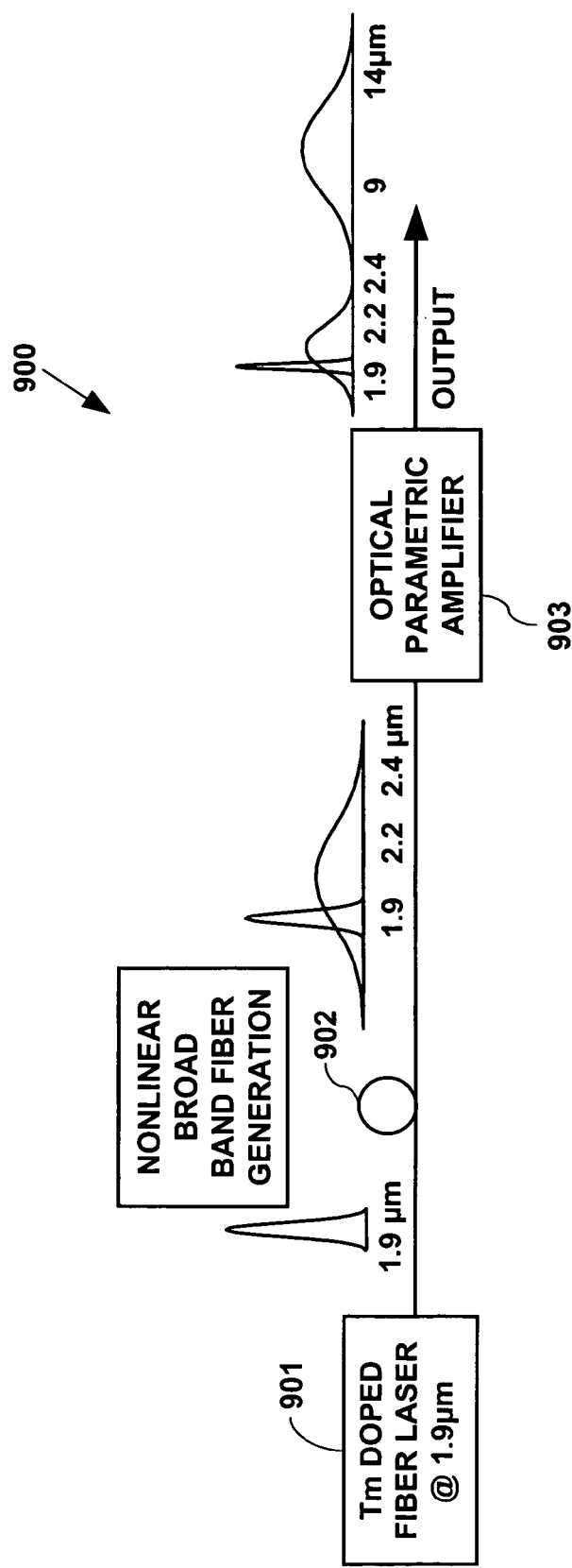
FIG. 9 shows details of additional spectral coverage in the far-IR spectral region included in the present invention.

Referring now to FIG. 9, a system to produce countermeasure spectral coverage over the far-IR spectral ranges is described. One or more stages of broadband generator are combined with one or more fundamental beams and frequency conversion to provide the desired coverage. The system 900 provides one of many possible system of producing coverage in far-IR regions. A thulium-doped fiber amplifier 901 produces output at 1.9 microns. This output is sent through broadband generator 902 producing coverage over the 2.2-2.4 micron region in addition to the strong residual 1.9 micron beam. This beam is then sent to OPA 903 which produces broad spectral coverage over the 9-14 micron region. Alternatively, the 1.9 micron beam may be first split, with one leg sent to the broadband generator, then recombined prior to far-IR generation.

Figure 10:
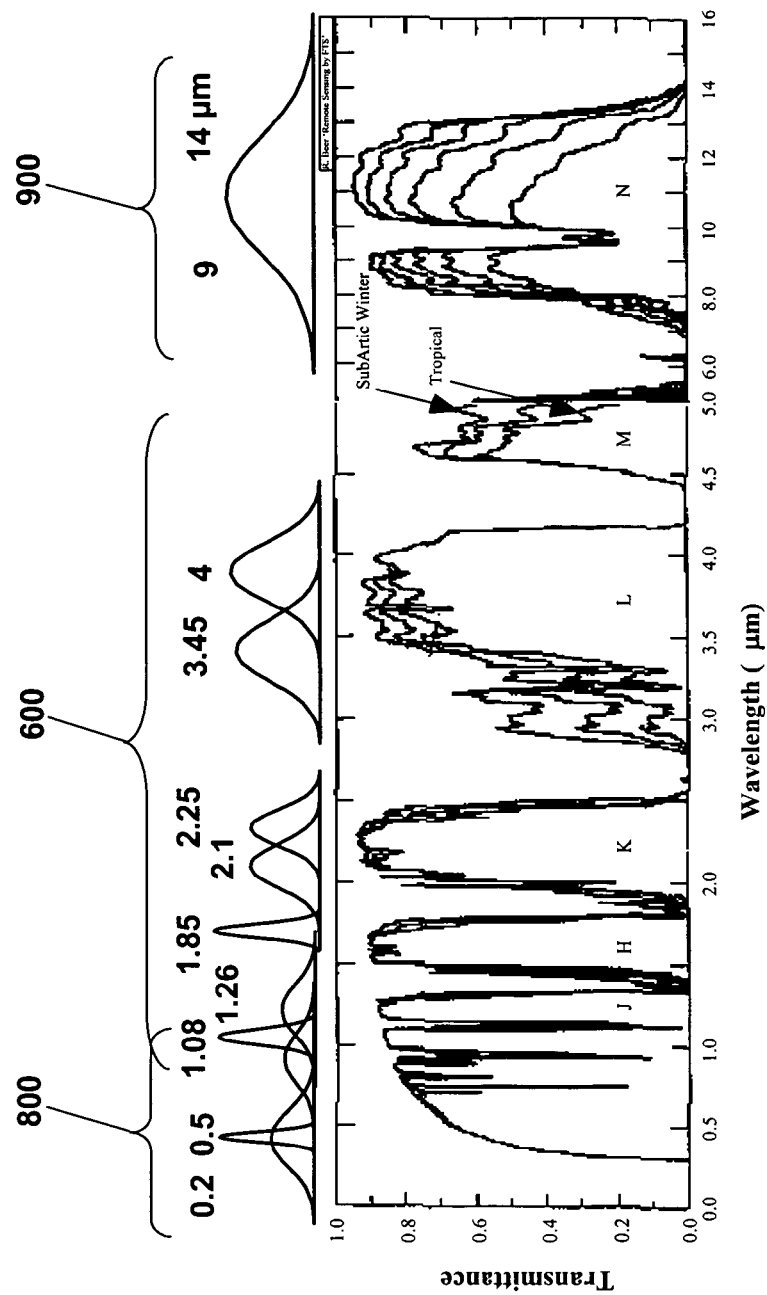
FIG. 10 provides charts showing that the aircraft countermeasure system generates wavelength bands that are optimized for atmospheric transmission.

Referring now to FIG. 10, a chart is provided showing that the sensor-guided threat countermeasure system of the present invention generates wavelength bands that are optimized for atmospheric transmission. The charts are based upon the transmission model MODTRAN. By example, shown above the atmospheric transmission chart is the spectral coverage provided by sources 600, 700, and 800. Additional coverage in the 4.5-5 micron band or increased coverage in the 1.5 micron region is obtained by utilizing sources 200 or 400 or in alternative system by the methods taught above.

Figure 11:
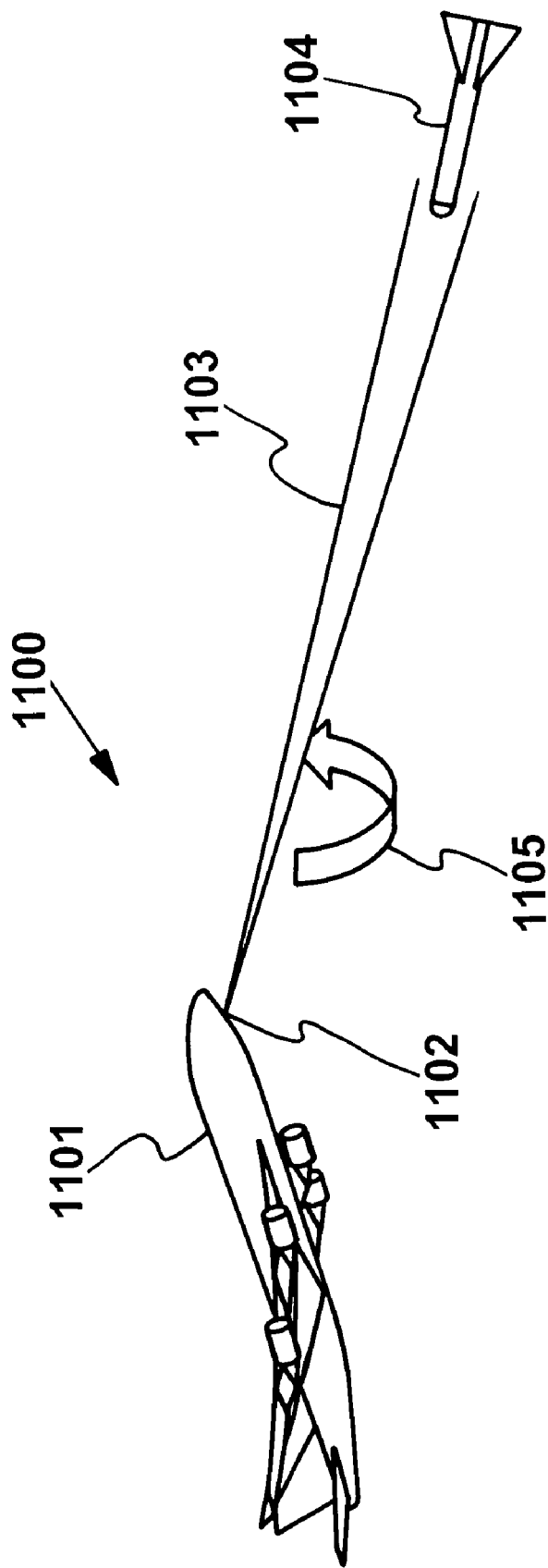
FIG. 11 illustrates another embodiment of an aircraft countermeasure system incorporating the present invention.

Referring now to FIG. 11, another embodiment of an aircraft countermeasure system incorporating the present invention is illustrated. The system is designated generally by the reference numeral 1100. The countermeasure system 1100 is adapted for use on board an aircraft 1101, for confusing an incoming missile 1104. The aircraft countermeasure system 1100 includes a system 1102 for directing at least one beam of energy 1103 from the aircraft. The aircraft countermeasure system 1100 also includes a system 1105 for moving the beam 1103 to provide a desired coverage of area.

The system 1102 is a laser system that produces a beam of energy 1103 that is mid IR optimized for atmospheric transmission windows and uses short picosecond pulses (0.1-999 ps) to drive nonlinear processes required to convert near IR wavelength telecom fiber laser output to the mid IR (1800-5000 nm) and to generate broad band output. The laser system produces a beam of energy 1103 covering the near and mid IR range (700-5000 nm). The system can also provide coverage throughout the UV and visible range (200-1000 nm) by frequency conversion of the near and mid IR output.

The countermeasure system includes a system for generating broadband output from narrower bandwidth input through nonlinear processes. These nonlinear broadband generators consist of tapered, microstructure, or other fiber or bulk components that produces sufficient intensity and nonlinear interaction to create a broadband (>50 nm) output spectrum.

The aircraft countermeasure system 1100 comprises a fiber laser source providing a directional infrared countermeasure (DIRCM) aircraft protection system based on a short pulse fiber lasers. The system 1100 is designed to be low cost and meet required performance specifications suitable for military and/or commercial aircraft integration. The broadband multi-line IR laser system (MIRLS) uses high production volume telecom fiber components to produce a low cost system compared to conventional bulk lasers. The system 1100 uses short laser pulses (0.1-10000 ps) to drive nonlinear processes required to convert near IR wavelength telecom fiber laser output to the mid IR (1800-5000 nm) and to generate broadband output to produce a robust countermeasure system.

The laser 1102 is a fiber laser designed to produce output power in the near and mid-wave IR region spanning 0.6-5 microns and located at atmospheric transmission windows. Specific bands of interest included ~2.2 micron, ~3.5 micron and ~4 micron. The laser 1102 is designed to produce output at or near these wavelengths from a single output coupler. Alternatively, multiple outputs are employed if more convenient for system architecture.

Figure 12:
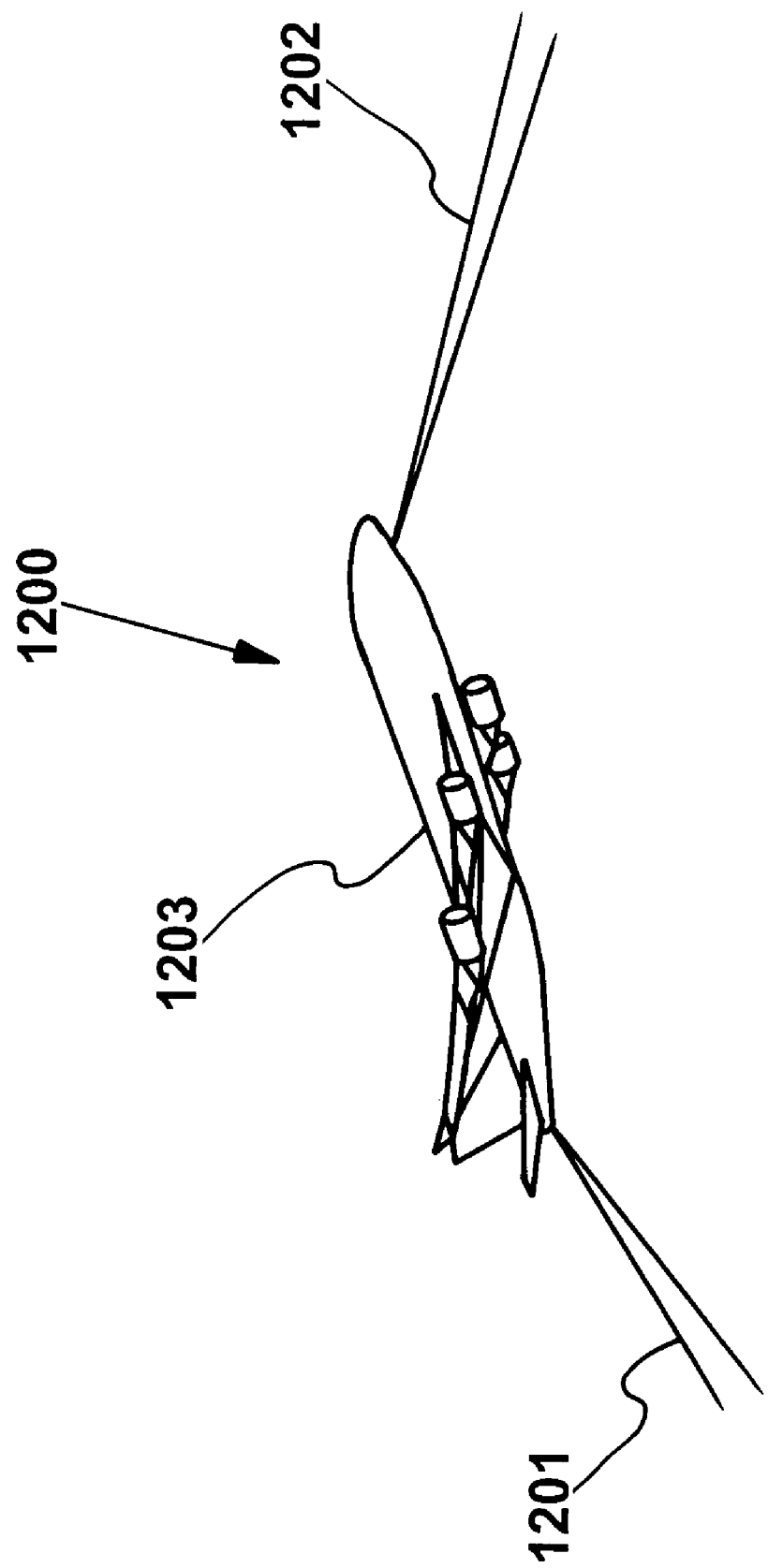
FIG. 12 illustrates another embodiment of an aircraft countermeasure system incorporating the present invention.

Referring now to FIG. 12, another embodiment of an aircraft countermeasure system incorporating the present invention is illustrated. The system is designated generally by the reference numeral 1200. The countermeasure system 1200 is adapted for use on board an aircraft 1203, for confusing an incoming missile. The aircraft countermeasure system 1200 includes systems for directing beams of energy 1201 and 1202 from the aircraft.

The systems for directing beams of energy are laser systems that produce beams of energy 1201 and 1202. The beams of energy 1201 and 1202 are mid IR optimized for atmospheric transmission windows and uses short picosecond pulses (0.1-999 ps) to drive nonlinear processes required to convert near IR wavelength telecom fiber laser output to the mid IR (1800-5000 nm) and to generate broad band output. The laser systems produces a beams of energy 1201 and 1202 covering the near and mid IR range (700-5000 nm). The systems can also provide coverage throughout the UV and visible range (200-1000 nm) by frequency conversion of the near and mid IR output.

Figure 13:
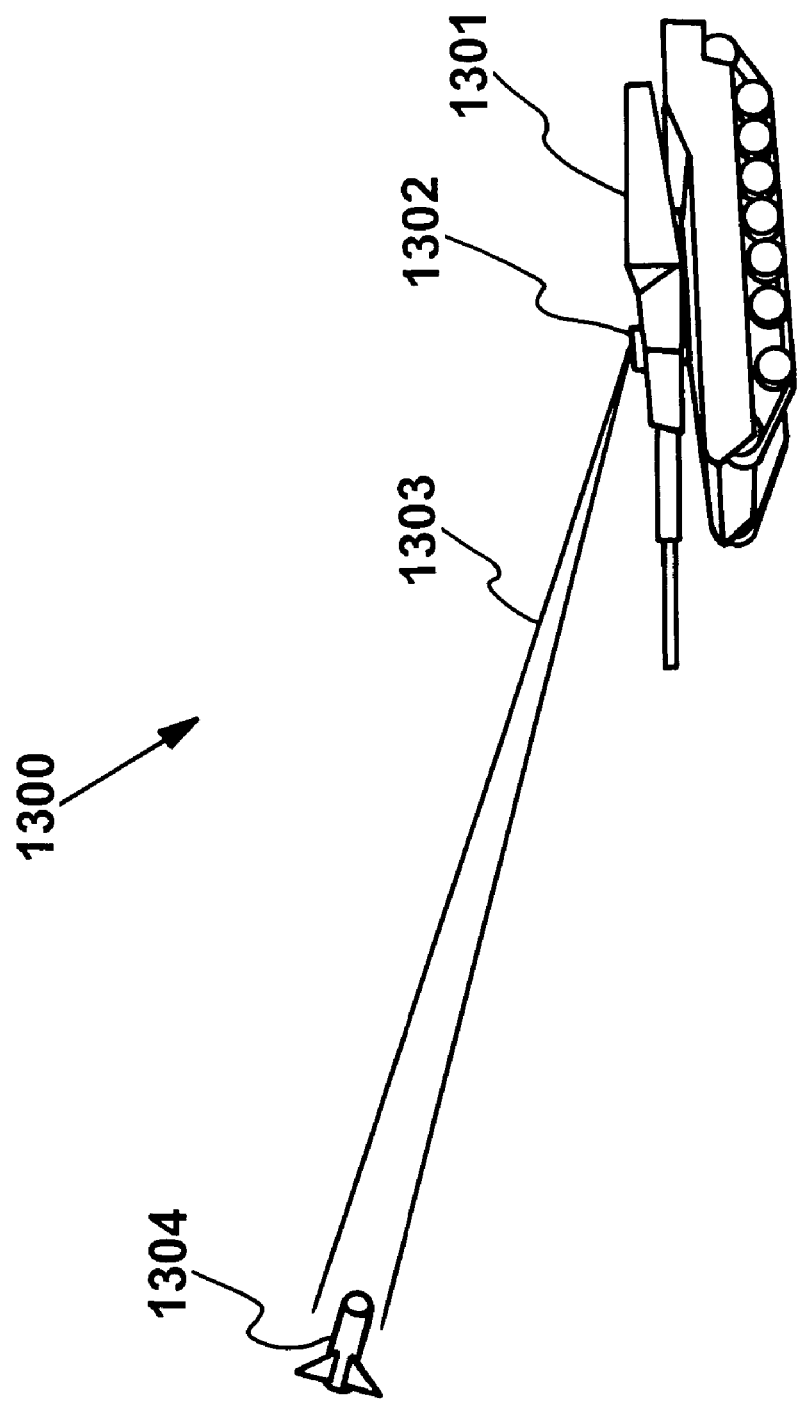
FIG. 13 illustrates another embodiment of a countermeasure system incorporating the present invention.

Referring to FIG. 13, another embodiment of a countermeasure system incorporating the present invention is illustrated. The system is designated generally by the reference numeral 1300. The countermeasure system 1300 is adapted for use on board a land vehicle 1301 or landcraft. In the embodiment 1300 the vehicle is a tank 1301. The countermeasure system 1300 includes a system 1302 for directing a beam of energy 1303 from the vehicle 1301 for confusing an incoming missile 1304.

The system 1302 is a laser system that produces a beam of energy 1303 that is mid IR optimized for atmospheric transmission windows and uses short picosecond pulses (0.1-999 ps) to drive nonlinear processes required to convert near IR wavelength telecom fiber laser output to the mid IR (1800-5000 nm) and to generate broad band output. The laser system produces a beam of energy 1303 covering the near and mid IR range (700-5000 nm). The system can also provide coverage throughout the UV and visible range (200-1000 nm) by frequency conversion of the near and mid IR output.

The countermeasure system includes a system for generating broadband output from narrower bandwidth input through nonlinear processes. These nonlinear broadband generators consist of tapered, microstructure, or other fiber or bulk components that produces sufficient intensity and nonlinear interaction to create a broadband (>50 nm) output spectrum.

The countermeasure system 1300 comprises a fiber laser source providing a directional infrared countermeasure (DIRCM) protection system based on a short pulse fiber lasers. The system 1300 is designed to be low cost and meet required performance specifications suitable for military and/or commercial vehicle integration. The broadband multi-line IR laser system (MIRLS) uses high production volume telecom fiber components to produce a low cost system compared to conventional bulk lasers. The system 1300 uses short laser pulses (0.1-10000 ps) to drive nonlinear processes required to convert near IR wavelength telecom fiber laser output to the mid IR (1800-5000 nm) and to generate broadband output to produce a robust countermeasure system.

Figure 14:
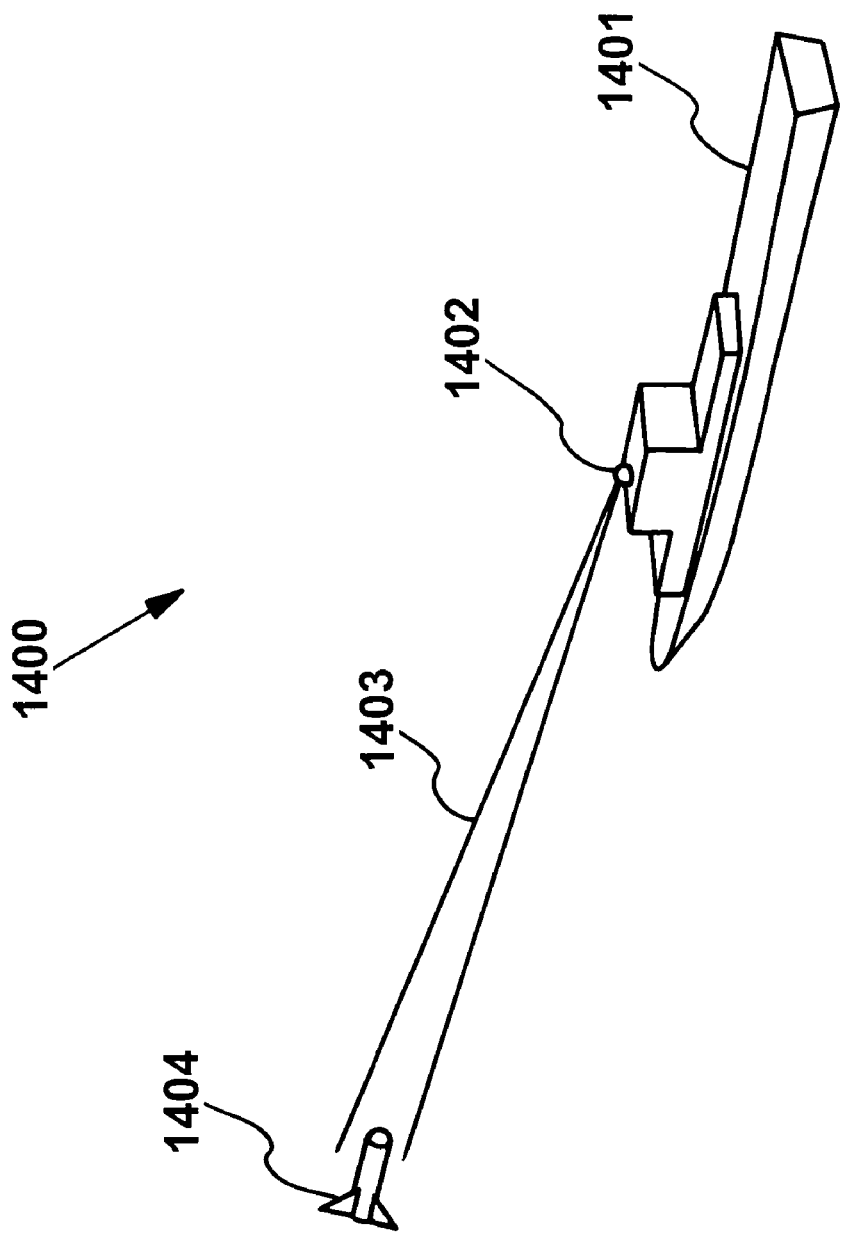
FIG. 14 illustrates another embodiment of a countermeasure system incorporating the present invention.

Referring to FIG. 14, another embodiment of a countermeasure system incorporating the present invention is illustrated. The system is designated generally by the reference numeral 1400. The countermeasure system 1400 is adapted for use on board a seacraft 1401. In the embodiment 1400 the seacraft is a patrol boat 1401. The countermeasure system 1400 includes a system 1402 for directing a beam of energy 1403 from the seacraft 1401 for confusing an incoming missile 1404.

The system 1402 is a laser system that produces a beam of energy 1403 that is mid IR optimized for atmospheric transmission windows and uses short picosecond pulses (0.1-999 ps) to drive nonlinear processes required to convert near IR wavelength telecom fiber laser output to the mid IR (1800-5000 nm) and to generate broad band output. The laser system produces a beam of energy 1403 covering the near and mid IR range (700-5000 nm). The system can also provide coverage throughout the UV and visible range (200-1000 nm) by frequency conversion of the near and mid IR output.

The countermeasure system includes a system for generating broadband output from narrower bandwidth input through nonlinear processes. These nonlinear broadband generators consist of tapered, microstructure, or other fiber or bulk components that produces sufficient intensity and nonlinear interaction to create a broadband (>50 nm) output spectrum.

The countermeasure system 1400 comprises a fiber laser source providing a directional infrared countermeasure (DIRCM) protection system based on a short pulse fiber lasers. The system 1400 is designed to be low cost and meet required performance specifications suitable for military and/or commercial integration. The broadband multi-line IR laser system (MIRLS) uses high production volume telecom fiber components to produce a low cost system compared to conventional bulk lasers. The system 1400 uses short laser pulses (0.1-10000 ps) to drive nonlinear processes required to convert near IR wavelength telecom fiber laser output to the mid IR (1800-5000 nm) and to generate broadband output to produce a robust countermeasure system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A countermeasure apparatus for use to protect an airplane against an incoming sensor-guided heat-seeking missile, comprising:
    a laser and optical system on the airplane for producing broadband, >50 nm, output laser beam lying in one or more atmospheric spectral windows in the range 0.2-14 microns, and
    a system for directing said broadband output beam from the airplane at the incoming sensor-guided heat-seeking missile to blind, dazzle, confuse, or destroy the incoming sensor-guided heat-seeking missile.

2. The countermeasure apparatus of claim 1 wherein the sensor-guided heat-seeking missile utilizes a single or multi-element sensor active in the infrared region (0.2-14 microns) and wherein said laser and optical system on the airplane produces said laser beam for reaching the heat-seeking missile with a broadband, >50 nm, output beam lying in one or more atmospheric spectral windows in the range 0.2-14 microns to blind, dazzle, confuse, or destroy the heat-seeking missile.

3. The countermeasure apparatus of claim 1 including a system for mounting said laser and optical system on the airplane.

4. The countermeasure apparatus of claim 1 including a system for mounting the countermeasure apparatus on a landcraft.

5. The countermeasure apparatus of claim 1 including a system for mounting the countermeasure apparatus on a seacraft.

6. The countermeasure apparatus of claim 1 wherein said laser and optical system contains a laser oscillator producing pulses of 0.1-10000 ps.

7. The countermeasure apparatus of claim 1 wherein said laser and optical system contains a fiber laser oscillator producing pulses of 0.1-10000 ps.

8. The countermeasure apparatus of claim 1 wherein said laser and optical system contains a semiconductor laser oscillator producing pulses of 0.1-10000 ps.

9. The countermeasure apparatus of claim 1 wherein said laser and optical system contains a fiber amplifier for amplification of pulses of 0.1-10000 ps.

10. The countermeasure apparatus of claim 1 wherein said laser and optical system contains a fiber amplifier for amplification of pulses in the spectral range of 0.5-10 microns.

11. The countermeasure apparatus of claim 1 wherein said laser and optical system contains a Thulium doped fiber laser system.

12. The countermeasure apparatus of claim 1 wherein said laser and optical system contains a Ytterbium doped fiber laser system.

13. The countermeasure apparatus of claim 1 wherein said laser and optical system contains an Erbium doped fiber laser system.

14. The countermeasure apparatus of claim 1 wherein said laser and optical system contains a combination of Thulium, Erbium, or Ytterbium doped fiber laser systems.

15. The countermeasure apparatus of claim 1 wherein said laser and optical system contains one or more optical parametric amplifiers.

16. The countermeasure apparatus of claim 1 wherein said laser and optical system contains one or more optical parametric amplifiers based on periodically poled materials.

17. The countermeasure apparatus of claim 1 wherein said laser and optical system contains one or more cascaded optical parametric amplifiers.

18. The countermeasure apparatus of claim 1 wherein said laser and optical system contains one or more multi-band optical parametric amplifiers that simultaneously phase-match three separate three-wave interactions.

19. The countermeasure apparatus of claim 1 wherein said laser and optical system contains one or more multi-band optical parametric amplifiers based on periodically poled RTA.

20. The countermeasure apparatus of claim 1 wherein said laser and optical system contains one or more broadband frequency generators.

21. The countermeasure apparatus of claim 1 wherein said laser and optical system contains one or more broadband frequency generators consisting of optical, tapered, or microstructure fibers.

22. The countermeasure apparatus of claim 1 wherein said laser and optical system contains one or more broadband frequency generators consisting of bulk transparent material.

23. The countermeasure apparatus of claim 1 wherein said laser and optical system contains one or more frequency converters or generators to provide full spectral coverage over the 0.2-14 micron spectral range.

24. The countermeasure apparatus of claim 1 wherein said laser and optical system operates at a pulse repetition frequency of single shot to 10 GHz.

25. The countermeasure apparatus of claim 1 wherein said laser and optical system output is modulated in time to confuse the heat-seeking missile.

26. The countermeasure apparatus of claim 1 wherein said laser and optical system produces an output spectrum that is actively or passively adjusted to optimize for a given heat-seeking missile.

27. The countermeasure apparatus of claim 1 wherein said laser and optical system for producing said broadband output laser beam consists of one or more output apertures that are controlled to aim at the heat-seeking missile.

28. The countermeasure apparatus of claim 1 wherein said laser and optical system on the airplane includes one or more laser and optical systems.

29. A countermeasure method for use to protect an airplane against an incoming sensor-guided heat-seeking missile, comprising the steps of:
providing a laser and optical system on the airplane for producing broadband, >50 nm, output laser beam lying in one or more atmospheric spectral windows in the range 0.2-14 microns, and
directing said broadband output laser beam lying in one or more atmospheric spectral windows in the range 0.2-14 microns at the incoming sensor-guided heat-seeking missile to blind, dazzle, confuse, or destroy the incoming sensor-guided heat-seeking missile.

30. The countermeasure method of claim 29 wherein the sensor-guided heat-seeking missile utilizes a single or multi-element sensor active in the infrared region, 0.2-14 microns, and wherein said laser and optical system on the airplane produces said laser beam for reaching the heat-seeking missile with a broadband, >50 nm, output beam lying in one or more atmospheric spectral windows in the range 0.2-14 microns to blind, dazzle, confuse, or destroy the heat-seeking missile.

31. The countermeasure method of claim 29 wherein said step of providing a laser and optical system for producing broadband, >50 nm, output beam comprises providing a laser and optical system containing a laser oscillator producing pulses of 0.1-10000 ps.

32. The countermeasure method of claim 29 wherein said step of providing a laser and optical system for producing broadband, >50 nm, output beam comprises providing a laser and optical system containing a fiber laser oscillator producing pulses of 0.1-10000 ps.

33. The countermeasure method of claim 29 wherein said step of providing a laser and optical system for producing broadband, >50 nm, output beam comprises providing a laser and optical system containing a semiconductor laser oscillator producing pulses of 0.1-10000 ps.

34. The countermeasure method of claim 30 wherein said step of providing a laser and optical system for producing broadband, >50 nm, output beam comprises providing a laser and optical system containing a fiber amplifier for amplification of pulses of 0.1-10000 ps.

35. The countermeasure method of claim 29 wherein said step of providing a laser and optical system for producing broadband, >50 nm, output beam comprises providing a laser and optical system containing a fiber amplifier for amplification of pulses in the spectral range of 0.5-10 microns.

36. The countermeasure method of claim 29 wherein said step of providing a laser and optical system for producing broadband, >50 nm, output beam comprises providing a laser and optical system containing a Thulium doped fiber laser system.

37. The countermeasure method of claim 29 wherein said step of providing a laser and optical system for producing broadband, >50 nm, output beam comprises providing laser and optical system containing a Ytterbium doped fiber laser system.

38. The countermeasure method of claim 29 wherein said step of providing a laser and optical system for producing broadband, >50 nm, output beam comprises providing a laser and optical system containing an Erbium doped fiber laser system.

39. The countermeasure method of claim 29 wherein said step of providing a laser and optical system for producing broadband, >50 nm, output beam comprises providing a laser and optical system containing a combination of Thulium, Erbium, or Ytterbium doped fiber laser systems.

40. The countermeasure method of claim 29 wherein said step of providing a laser and optical system for producing broadband, >50 nm, output beam comprises providing a laser and optical system containing one or more optical parametric amplifiers.

41. The countermeasure method of claim 29 wherein said step of providing a laser and optical system for producing broadband, >50 nm, output beam comprises providing a laser and optical system containing one or more optical parametric amplifiers based on periodically poled materials.

42. The countermeasure method of claim 29 wherein said step of providing a laser and optical system for producing broadband, >50 nm, output beam comprises providing a laser and optical system containing one or more cascaded optical parametric amplifiers.

43. The countermeasure method of claim 29 wherein said step of providing a laser and optical system for producing broadband, >50 nm, output beam comprises providing a laser and optical system containing one or more multi-band optical parametric amplifiers that simultaneously phase-match three separate three-wave interactions.

44. The countermeasure method of claim 29 wherein said step of providing a laser and optical system for producing broadband, >50 nm, output beam comprises providing a laser and optical system containing one or more multi-band optical parametric amplifiers based on periodically poled RTA.

45. The countermeasure method of claim 29 wherein said step of providing a laser and optical system for producing broadband, >50 nm, output beam comprises providing a laser and optical system containing one or more broadband frequency generators.

46. The countermeasure method of claim 29 wherein said step of providing a laser and optical system for producing broadband, >50 nm, output beam comprises providing a laser and optical system containing one or more broadband frequency generators consisting of optical, tapered, or microstructure fibers.

47. The countermeasure method of claim 29 wherein said step of providing a laser and optical system for producing broadband, >50 nm, output beam comprises providing a laser and optical system containing one or more broadband frequency generators consisting of bulk transparent material.

48. The countermeasure method of claim 29 wherein said step of providing a laser and optical system for producing broadband, >50 nm, output beam comprises providing a laser and optical system containing one or more frequency converters or generators to provide full spectral coverage over the 0.2-14 micron spectral range.

49. The countermeasure method of claim 29 wherein said step of providing a laser and optical system for producing broadband, >50 nm, output beam comprises providing a laser and optical system operating at a pulse repetition frequency of single shot to 10 GHz.

50. The countermeasure method of claim 29 wherein said laser and optical system output is modulated in time to confuse the heat-seeking missile.

51. The countermeasure method of claim 29 wherein said step of providing a laser and optical system for producing broadband, >50 nm, output beam comprises providing a laser and optical system with an output spectrum that is actively or passively adjusted to optimize for a given threat heat-seeking missile.

52. The countermeasure method of claim 29 utilizing more than one laser and optical systems.

\* \* \* \* \*